United States Patent
Chen

(10) Patent No.: US 10,062,884 B2
(45) Date of Patent: Aug. 28, 2018

(54) UNIVERSAL DEVICE FOR QUICKLY PLUGGING AND UNPLUGGING BATTERY OF A UAV

(71) Applicant: Shenzhen Digital Era Technology Co., LTD., Shenzhen (CN)

(72) Inventor: Ruihong Chen, Shenzhen (CN)

(73) Assignee: Shenzhen Digital Era Technology Co., LTD., Shenzhen (CN)

( * ) Notice: Subject to any disclaimer, the term of this patent is extended or adjusted under 35 U.S.C. 154(b) by 82 days.

(21) Appl. No.: 15/373,340

(22) Filed: Dec. 8, 2016

(65) Prior Publication Data

US 2017/0162842 A1 Jun. 8, 2017

(30) Foreign Application Priority Data

Dec. 8, 2015 (CN) .......................... 2015 1 0897775

(51) Int. Cl.
| | |
|---|---|
| *H01M 2/10* | (2006.01) |
| *B60L 11/18* | (2006.01) |
| *H01R 13/627* | (2006.01) |

(52) U.S. Cl.
CPC ........ *H01M 2/1083* (2013.01); *B60L 11/1879* (2013.01); *B60L 2200/10* (2013.01); *H01M 2220/20* (2013.01); *H01R 13/6275* (2013.01)

(58) Field of Classification Search
CPC ............ H01M 2/1083; H01M 2220/20; B60L 11/1879; B60L 2200/20; H01R 13/6275
See application file for complete search history.

(56) References Cited

U.S. PATENT DOCUMENTS 4,936,409 A * 6/1990 Nix .......................... B60R 16/04
                                                              180/68.5
5,848,456 A * 12/1998 Sjoqvist ............. H01R 13/6275
                                                              24/618

* cited by examiner

*Primary Examiner* — Oi K Conley
(74) *Attorney, Agent, or Firm* — Schwegman Lundberg & Woessner, P.A.

(57) ABSTRACT

A universal device for quickly plugging and unplugging a battery of a UAV, includes a battery fixing plate and a battery base assembly wherein the battery fixing plate includes a battery fixing plate body, a male plug and copper pillars located on a front part of the battery fixing plate body, and slots and handheld feet located on both sides of a rear part of the battery fixing plate body, wherein the battery base assembly includes a battery base body formed by assembling a plurality of fiberglass boards, slots and tabs disposed on two sides of an inner wall of the battery base body, and a female socket located on a front part of the battery base body. The universal device for quickly plugging and unplugging a battery of a UAV provided by the present invention have many significant technical effects, such as, the battery can be simply and rapidly replaced; and has a beautiful and reliable structure, the high universality and compatibility low production cost, and simple assembly process, and so on.

10 Claims, 9 Drawing Sheets

UNIVERSAL DEVICE FOR QUICKLY PLUGGING AND UNPLUGGING BATTERY OF A UAV

CLAIM OF PRIORITY

This application claims the benefit of priority under 35 U.S.C. § 119 to Chinese Patent Application No. 201510897775.8, filed on Dec. 8, 2015, which is incorporated by reference herein in its entirety.

TECHNICAL FIELD

The present invention relates to a technical field of unmanned aerial vehicle apparatuses, and in particular to a universal device for quickly plugging and unplugging a battery of an unmanned aerial vehicle (UAV).

BACKGROUND ART

In recent years, with rise of unmanned aerial vehicles and related aircraft models, and rapid development of unmanned aerial vehicles, unmanned aerial vehicles are applied in more and more different application scenarios. In this process, there are more and more people starting to contact unmanned aerial vehicles, thence, the unmanned aerial vehicles enter an entertainment field from a professional research field.

The unmanned aerial vehicle (UAV), commonly known as a drone, is an aircraft without a human pilot aboard and manipulated by radio remote control equipment and self-contained programmed control device. The UAVs can be divided into military UAVs and civilian UAVs, according to the field they are applied in. The UAVs mainly include aerial photographing four-axis UAVs and six-axis UAVs, among others.

However, the study found that the plugs employed by many current UAVs still have some technical defects. For example, based on the introduction to mainstream aeromodelling plugs and analyses on weaknesses thereof, they are divided in the current market into two species.

The first type is T-type or XT60-type plug-pull plugs and other variants or similar plugs.

FIG. 1 and FIG. 2 separately show a schematic view of the first type of plugs (i.e. the T-type plug in FIG. 2 and the XT60-type plug in FIG. 1). These plug structures are usually used in an aircraft model aircraft, model cars and other model aircraft toys. Now, four-axis crossing racing drones emerge, almost all using the XT60 plug to connect the battery thereof.

Because the two types of plugs (i.e. T-type and XT60-type) are only responsible for connecting the battery and the main board, the battery requires an additional fastening fixture, such as double-sided adhesive stickers, cable ties. Velcro, that is, it is required to use a variety of fastening means. A special shell mold or a battery plug fixing member is also required.

The second type is a dedicated battery case, as shown in FIG. 3, wherein a dedicated battery package way is used to hold the battery. The dedicated battery case shown in FIG. 3 is commonly used in four-axis UAVs and six-axis UAVs.

Obviously, these two types of plug structures of UAVs, as the market mainstream, are not easy to get balance between the difficulty in mass production, cost and ease of use, maintainability, and strength. A simple qualitative analysis is made for drawbacks of these two main types.

The first type, including T-type or XT60-type plug-pull plugs and other variants or similar plugs, is considered.

The solution, which has been applied in the field of aircraft modules for many years, is easy to be implemented and produced, the cost is low, but also has very obvious shortcomings.

For example, a battery using the T-type or XT60-type plug-pull plug is difficult to be replaced. In order to ensure stable operation under high current, the plug is normally connected very tightly. When users replace the battery, it needs a greater effort to pull out the battery and insert a new battery therein. The exposed connecting wires are easy to be hit by paddles, which needs additional fix means. Wire connectors are exposed, leading to the poor appearance. Due to restrictions of connections and fix means, in the field of ordinary UAVs, it is difficult to integrate them with the body in terms of appearance design. Therefore, among the products on the market, only relative low-end products or those in the "small mass" area use these types.

The second type, a dedicated battery case solution, is considered.

The solution is popularized, mainly because of the rise of the ordinary UAVs. The users' higher requirements for the appearance and body of the UAVs prompt manufacturers to improve the connecting and arranging means of the battery, but it also brings about a lot of disadvantages.

For example, the universality of a traditional dedicated battery case is poor wherein the dedicated battery cases need customized batteries, connectors, and enclosures, and are designed to have appropriate plug-pull and fixing means. Therefore, by means of the dedicated battery case, batteries designed by different manufacturers are completely incompatible, so that the cost paid by the users is increased significantly. The repair difficulty is great and the cost is high, wherein the UAVs are very easy to fall damage, so all components on the UAVs should be easy to maintain. As a result of dedicated battery case solution, once the battery case is damaged, generally the UAV cannot be used continuously by repairing it, and users must re-purchase a battery. Production costs are high wherein a dedicated battery case requires a special mold, and almost all parts purchased need to be customized, and therefore the production costs are greatly increased and the assembly difficulty of mass production is also increased.

In summary, how to overcome the above technical defects of conventional UAVs are the technical problem to be solved by those skilled in the art.

DISCLOSURE OF THE INVENTION

The present invention is aimed to provide a universal device for quickly plugging and unplugging a battery of a UAV, to solve the problems mentioned above.

Embodiments of the present invention improve the arrangement structure and the operation method of a battery on a UAV, which can significantly reduce production costs and simultaneously greatly enhance the convenience and usability of plugging the battery to UAVs, and at the same time it has the strength which is not inferior to, even better than, those in the market.

In order to achieve the above objects, technical solutions provided by embodiments of the present invention are implemented as follows.

The universal device for quickly plugging and unplugging a battery of a UAV, provided by embodiments of the present invention, includes a battery fixing plate 100 and a battery base assembly 200.

Here, the battery fixing plate 100 particularly includes a battery fixing plate body 5, a male plug 1 and copper pillars 2 located on a front part of the battery fixing plate body 5, and slots 3 and handheld feet 4 located on two sides of a rear part of the battery fixing plate body 5.

The battery fixing plate body 5 is U-shaped as a whole, a middle forking gap is disposed between two sides of the U-shaped battery fixing plate body 5 but does not pass through the front part of the battery fixing plate body 5, and the middle forking gap is consisted of a V-shaped slit 6 disposed in the rear part of the battery fixing plate body 5 and an ellipse-shaped slit 7 disposed in the front part of the battery fixing plate body 5.

Here, the battery base assembly 200 particularly includes: a battery base body, formed by assembling a plurality of fiberglass boards; sliding slots 8 and tabs 9, disposed on two sides of an inner wall of the battery base body; and a female socket 10, located on a front part of the battery base body.

The battery fixing plate 100 and the battery base assembly 200 are in the connection relationship in which the two sides of the U-shaped battery fixing plate body 5 of the battery fixing plate 100 are respectively slidably connected with the sliding slots 8 disposed in two sides of the inner wall of the battery base body in the battery base assembly 200; the tabs 9 disposed on two sides of the inner wall of the battery base body are snapped with the slots 3 located on two sides of the battery fixing plate body 5; the handheld feet 4 are configured to connect the battery fixing plate 100 and the battery base assembly 200 by adjusting a width of the middle forking gap of the U-shaped battery fixing plate body 5.

Preferably, as an embodiment of the present invention, in the specific structure of the battery base assembly 200, the plurality of the fiberglass boards are three fiberglass boards, which include, from top to bottom, a top fiberglass board 11, a middle fiberglass board 12 and a bottom fiberglass board 13.

Moreover, the top fiberglass board 11 and the middle fiberglass board 12 are provide therein with an accommodating hole configured to accommodate the battery fixing plate 100; a hollow grid shelf is disposed in the bottom fiberglass board 13; the top fiberglass board 11, the middle fiberglass board 12 and the bottom fiberglass board 13 are sequentially stacked to form the battery base body; the inner wall of the middle fiberglass board 12 is inwardly recessed comparing with the inner walls of the top fiberglass board 11 and the bottom fiberglass board 13, to form the sliding slots 8 on two sides of the inner wall of the battery base body; the tabs 9 disposed on two sides thereof are on the middle fiberglass board 12.

Preferably, as an embodiment of the present invention, the universal device for quickly plugging and unplugging a battery of a UAV further includes an adhesive layer; the adhesive layer is configured to fix the battery to a surface of the battery fixing plate body 5 in the structure of the battery fixing plate 100.

Preferably, as an embodiment of the present invention, the male plug 1 is a 7P male plug or a 9P male plug.

Preferably, as an embodiment of the present invention, the female socket 10 is a 7P female socket or a 9P female socket.

Preferably, as an embodiment of the present invention, the handheld feet 4, as a whole, protrude from a surface of the rear part of the battery fixing plate body 5. A surface of the handheld foot 4 is configured as hollowed out, facilitating a finger to insert.

Preferably, as an embodiment of the present invention, a plurality of through holes are provided in the surface of the battery fixing plate body 5 and disposed on two sides of the middle forking gap. The plurality of through holes are arranged at an equal interval on the surface of the battery fixing plate body 5 and disposed on two sides of the middle forking gap; the plurality of through holes are circular or oval through holes.

Preferably, as an embodiment of the present invention, the hollows in the bottom fiberglass board 13 are plural, and the plurality of hollows are uniformly arranged in a grid to form the hollow grid shelf to support the battery fixing plate body 5.

Compared with the prior art, advantages of embodiments of the present invention include:

The universal device for quickly plugging and unplugging a battery of a UAV provided by the present invention is mainly consisted of two basic parts, a battery fixing plate 100 and a battery base assembly 200, wherein the battery fixing plate 100 includes a battery fixing plate body 5; a male plug 1 and copper pillars 2 located on a front part of the battery fixing plate body 5; and slots 3 and handheld feet 4 located on two sides of a rear part of the battery fixing plate body 5, wherein the battery base assembly 200 includes a battery base body formed by assembling a plurality of fiberglass boards; sliding slots 8 and tabs 9 disposed on two sides of an inner wall of the battery base body; and a female socket 10 located on a front part of the battery base body.

Meanwhile, the battery fixing plate 100 and the battery base assembly 200) are in a smart connection relationship in which two sides of the U-shaped battery fixing plate body 5 of the battery fixing plate 100 are respectively slidably connected with the sliding slots 8 disposed in two sides of the inner wall of the battery base body of the battery base assembly 200; the tabs 9 disposed on two sides of the inner wall of the battery base body are snapped with the slots 3 located on two sides of the battery fixing plate body 5; the handheld feet 4 are configured to connect the battery fixing plate 100 and the battery base assembly 200 by adjusting a width of the middle forking gap of the U-shaped battery fixing plate body 5.

The universal device for quickly plugging and unplugging a battery of a UAV provided by the embodiments of the present invention has many significant technical effects, such as, the battery can be simply and rapidly replaced, have the beautiful structure, and is reliable, and occupy a small structural space; and the structure is solid and reliable and has high-strength; the battery is uneasy to slide; it has high universality and strong compatibility; the production cost is low, the assembly is simple, and so on.

BRIEF DESCRIPTION OF DRAWINGS

In order to more clearly illustrate the embodiments of the present invention or technical solutions in the prior art, a brief introduction will be made below to drawings for the embodiments or technical solutions in the prior art. Obviously, the following drawings illustrate some embodiments of the present invention, and those skilled in the art, without creative efforts, also can conceive other drawings from these drawings.

Figure 1:
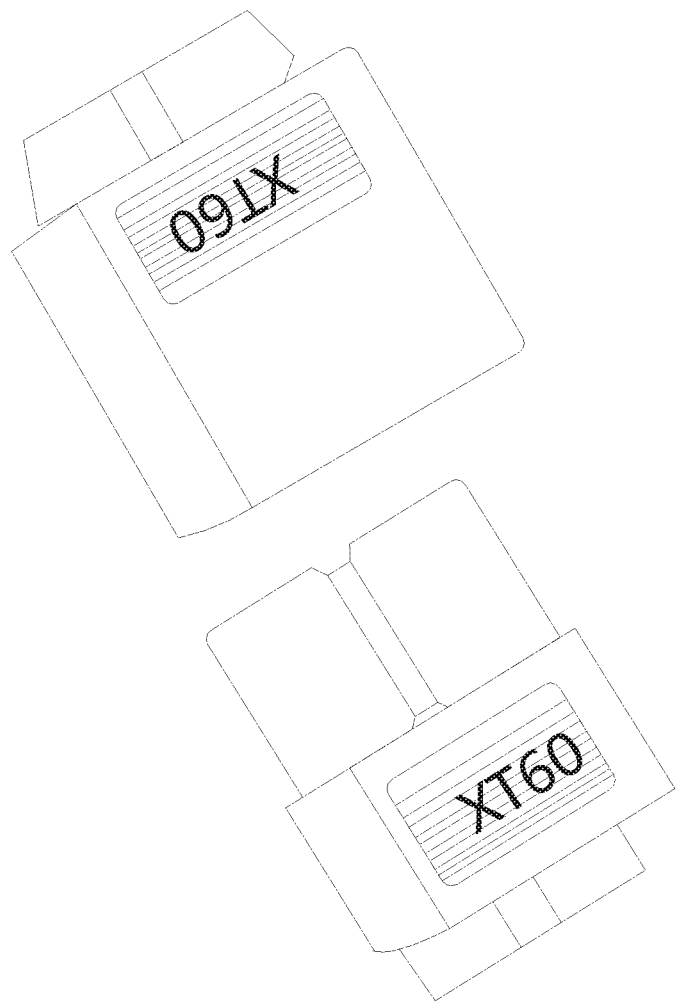
FIG. 1 is a structural schematic view of a conventional XT60 plug.
Figure 2:
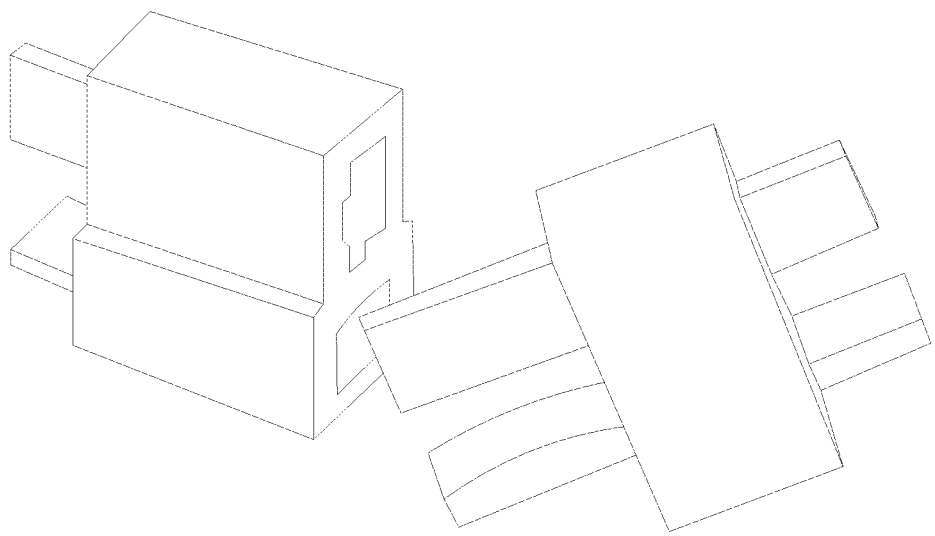
FIG. 2 is a structural schematic view of a conventional T plug.
Figure 3:
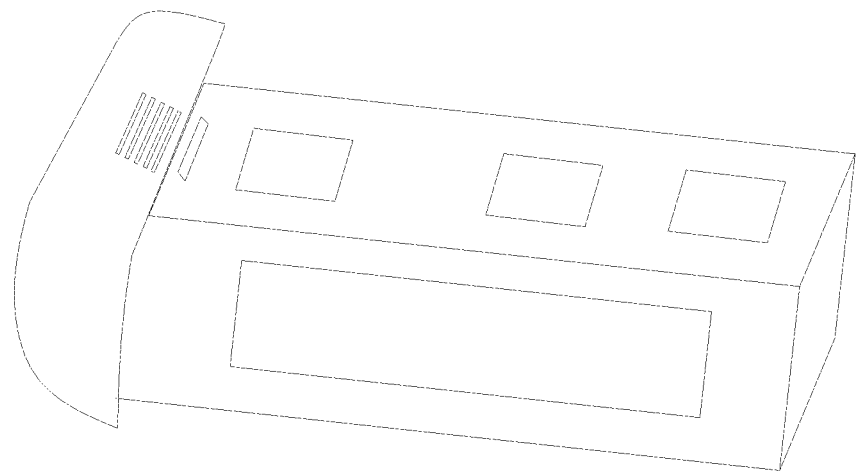
FIG. 3 is a structural schematic view of a conventional battery to which a dedicate battery case is externally mounted.

EXPLANATION OF REFERENCE NUMBERS battery fixing plate 100;
male plug 1; copper pillar 2; slot 3; handheld foot 4; battery fixing plate body 5; V-shaped slit 6; ellipse-shaped slit 7;
battery base assembly 200;
sliding slot 8; tab 9; female socket 10; top fiberglass board 11; middle fiberglass board 12; bottom fiberglass board 13.

DETAILED DESCRIPTION OF EMBODIMENTS

Below, referring to the drawings, the technical solutions of the present invention will be described clearly and completely. Apparently, the embodiments described below only involve some of embodiments of the present invention, instead of all embodiments. Based on these embodiments of the present invention, all other embodiments which may be easily obtained by those skilled in the art without paying any creative effort, are also covered within the scope of the present invention.

In the description of the present invention, it should be noted that, the terms "center", "upper", "lower", "left", "right", "vertical", "horizontal", "inside", "outside", etc., which refer to a orientation or positional relationship based on that shown in the figures, are only used to facilitate and simplify the description of the present invention, but not indicate or imply that the indicated device or element must be in the particular orientation, or configured and operated in the particular orientation, and therefore they cannot be construed as limiting the present invention. In addition, the terms "first", "second", "third" are used only for descriptive purposes and not construed as indicating or implying any importance of the relative relation.

In the description of the present invention, it should be noted that, unless clearly defined and limited otherwise, the term "installation", "connected", or "connection" should be broadly understood, for example, can be a fixed connection, a removable connection, or an integral connection; or a mechanical connection, or an electrical connection; or a direct connection or indirect connection through an intermediary, or an internal communication between two components. For those skilled in the art, the above terms can be understood to have the specific meaning in the present invention in the specific circumstances.

Below, referring to the drawings and the embodiments, the present invention will be described further.

Figure 9:
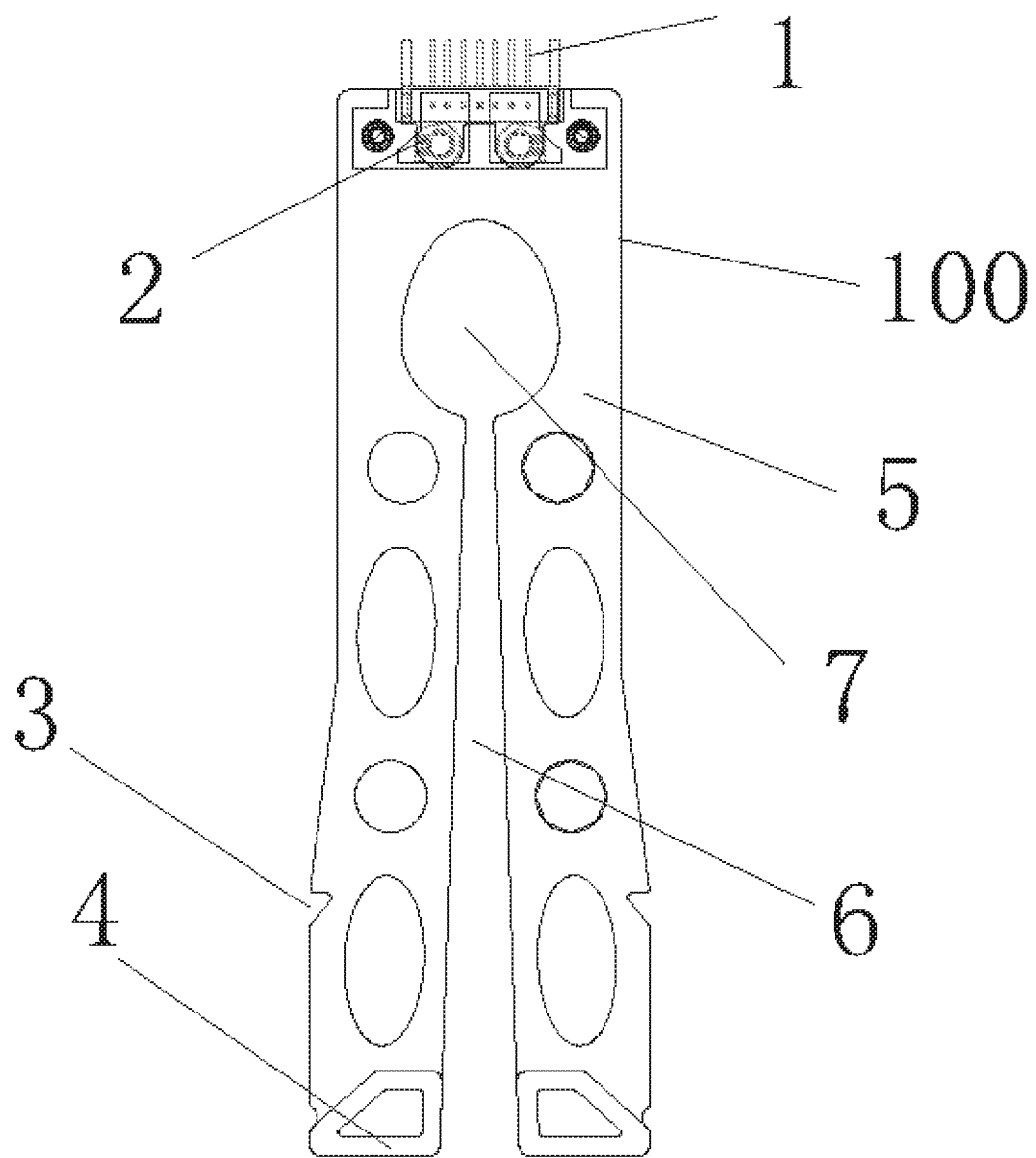
FIG. 9 is a top structural schematic view of the battery fixing plate in the universal device for quickly plugging and unplugging a battery of a UAV provided by embodiments of the present invention.
Figure 10:
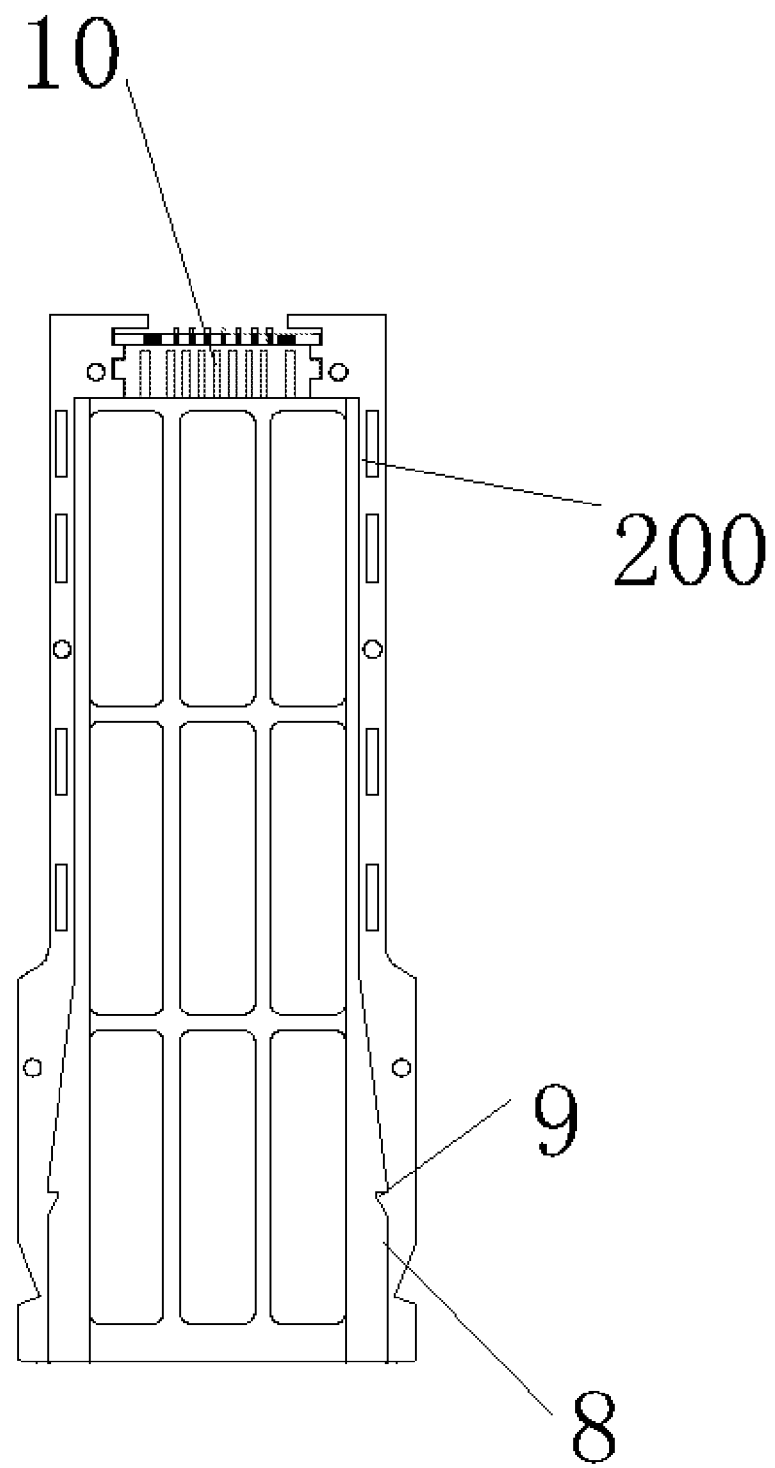
FIG. 10 is a top structural schematic view of the battery base assembly in the universal device for quickly plugging and unplugging a battery of a UAV provided by embodiments of the present invention.

Referring to FIG. 3, FIG. 4, FIG. 5, FIG. 6, FIG. 7, and FIG. 8, the universal device for quickly plugging and unplugging a battery of a UAV provided by embodiments of the present invention includes a battery fixing plate 100 (also see FIG. 9) and a battery base assembly 200 (also see FIG. 10).

Here, the battery fixing plate 100 includes a battery fixing plate body 5, a male plug 1 and copper pillars 2 located on a front part of the battery fixing plate body 5, and slots 3 and handheld feet 4 located on two sides of a rear part of the battery fixing plate body 5.

The battery fixing plate body 5 is U-shaped as a whole, a middle forking gap is disposed between two sides of the battery fixing plate body 5 but does not pass through the front part of the battery fixing plate body 5, and the middle forking gap is consisted of a V-shaped slit 6 disposed in the rear part of the battery fixing plate body 5 and an ellipse-shaped slit 7 disposed in the front part of the battery fixing plate body 5.

Here, the battery base assembly 200 includes a battery base body formed by assembling a plurality of fiberglass boards, sliding slots 8 and tabs 9 disposed on two sides of an inner wall of the battery base body, and a female socket 10 located on a front part of the battery base body.

The battery fixing plate 100 and the battery base assembly 200 are in a connection relationship in which two sides of the U-shaped battery fixing plate body 5 of the battery fixing plate 100 are respectively slidably connected with the sliding slots 8 disposed in two sides of the inner wall of the battery base body of the battery base assembly 200; the tabs 9 disposed on two sides of the inner wall of the battery base body are snapped with the slots 3 located on two sides of the battery fixing plate body 5; the handheld feet 4 are configured to connect the battery fixing plate 100 and the battery base assembly 200 by adjusting a width of the middle forking gap of the U-shaped battery fixing plate body 5 (when the handheld feet 4 are squeezed inwardly, the width of the middle forking gap of the U-shaped battery fixing plate body 5 becomes smaller, meanwhile two sides of the battery fixing plate body 5 approach each other, so that the tabs disposed on the battery base body are snapped or disengaged with the slots located on the battery fixing plate body 5).

In the structure of the battery base assembly 200, the plurality of the fiberglass boards are three fiberglass boards, which include a top fiberglass board 11, a middle fiberglass board 12 and a bottom fiberglass board 13 from top to bottom.

Moreover, an accommodating hole is provided in the top fiberglass board 11 and the middle fiberglass board 12, for accommodating the battery fixing plate 100; a hollow grid shelf is disposed in the bottom fiberglass board 13 (the hollow grid shelf in the bottom fiberglass board 13 is provided mainly to support the battery fixing plate 100); the top fiberglass board 11, the middle fiberglass board 12 and the bottom fiberglass board 13 are sequentially stacked to form the battery base body; the inner wall of the middle fiberglass board 12 is inwardly recessed comparing with the inner walls of the top fiberglass board 11 and the bottom fiberglass board 13, to form the sliding slots 8 on two sides of the inner wall of the battery base body; and the tabs 9 of the two sides are actually disposed on the middle fiberglass board 12.

Below, the structure and the technical effects of the universal device for quickly plugging and unplugging a battery of a UAV provided by embodiments of the present invention are explained in detail.

In the connection structure between the battery fixing plate, the universal device for quickly plugging and unplugging a battery of a UAV further includes an adhesive layer; the adhesive layer is configured to fix the battery to a surface of the battery fixing plate body 5 in the battery fixing plate 100.

In the structure of the plug and female socket, the male plug 1 is a 7P male plug or a 9P male plug, and the female socket 10 is a 7P female socket or a 9P female socket.

In the structure of the battery fixing plate, the handheld feet 4, as a whole, protrude from a surface of the rear part of the battery fixing plate body 5. A surface of the handheld foot 4 is configured as hollowed out, facilitating a finger to insert.

A plurality of through holes are provided in the surface of the battery fixing plate body 5 and disposed on two sides of the middle forking gap respectively. The plurality of through holes are arranged at an equal interval on the surface of the battery fixing plate body 5 and on two sides of the middle forking gap; the plurality of through holes are circular or oval through holes.

In the structure of the battery base assembly 200, the hollows in the bottom fiberglass board 13 are plural, and the plurality of hollows are uniformly arranged in a grid to form the hollow grid shelf to support the battery fixing plate body 5.

Figure 4:
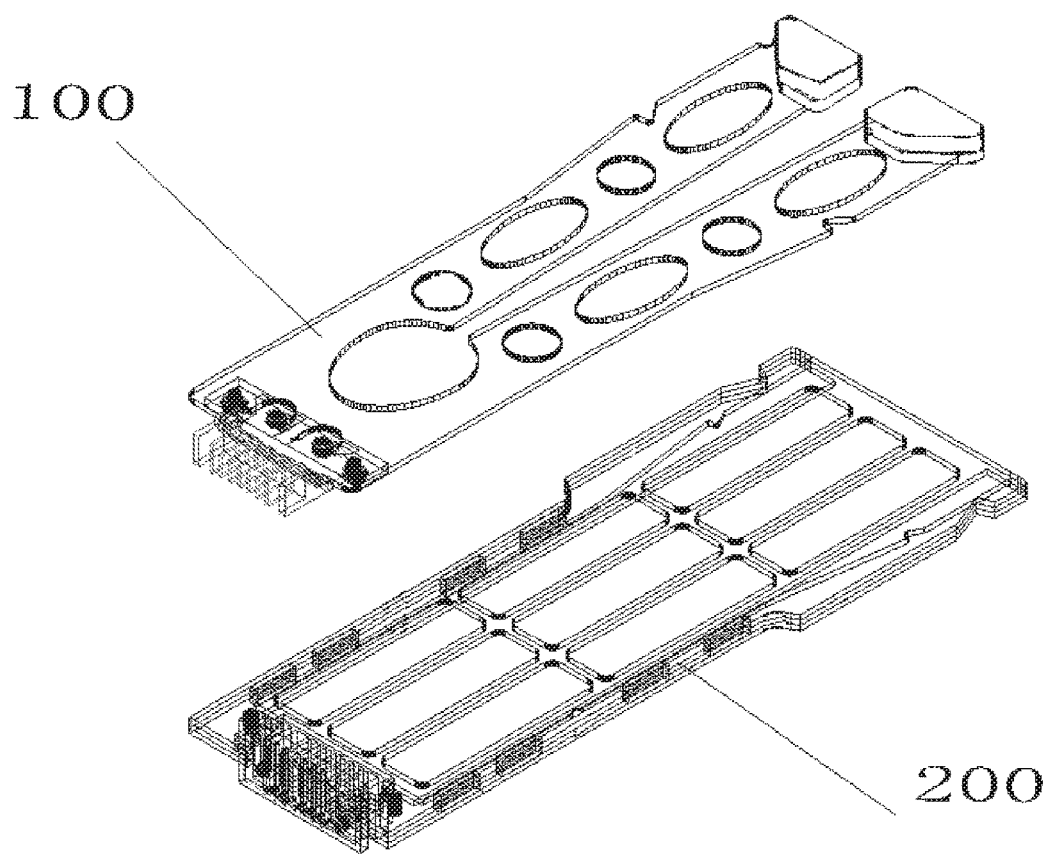
FIG. 4 is an exploded structural schematic view of a universal device for quickly plugging and unplugging a battery of a UAV provided by embodiments of the present invention.

In the embodiments:

as shown in the exploded view of FIG. 4, the exploded structure shows the structure of the universal device for quickly plugging and unplugging a battery of a UAV provided by embodiments of the present invention mainly includes two basic parts, a battery fixing plate 100 and a battery base assembly 200.

The battery fixing plate mentioned above is as follows (the battery fixing plate 100 is mainly composed of the battery fixing plate body 5, which in turn consists of the male plug 1, the copper pillars 2, the slots 3, the handheld feet 4, the V-shaped slit 6, the ellipse-shaped slit 7 and the like).

Figure 5:
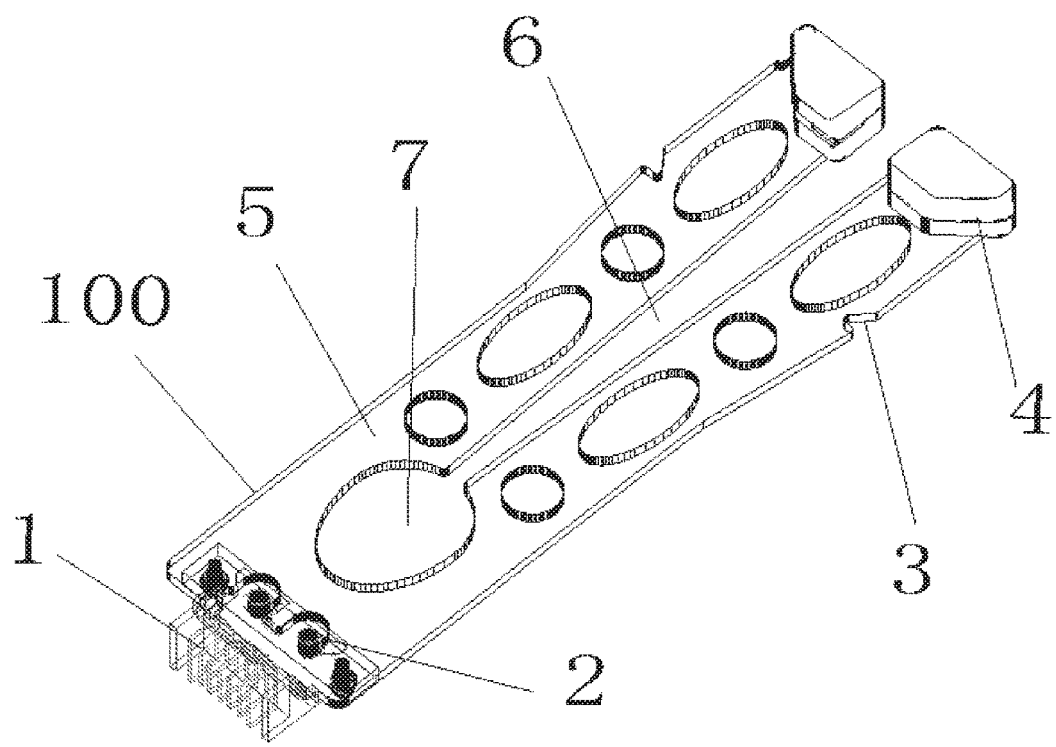
FIG. 5 is a view of a battery fixing plate in the universal device for quickly plugging and unplugging a battery of a UAV provided by embodiments of the present invention.

FIG. 5 is a view showing the battery fixing plate.

1. Without violating the length and width restrictions of the battery fixing plate and other restrictions of the battery compartment, a double-sided adhesive tape (i.e., the adhesive layer) is used to adhere the battery onto the battery fixing plate body 5 of the battery fixing plate 100.

2. Positive and negative wires of the battery need to be cut and peeled to expose the wire core of about 5 mm, and screwed onto two copper pillars 2 by screws.

3. One 7P (or 9P) male plug 1 is on the top of the battery fixing plate, and the two copper pillars 2 can be connected to any pin of the 7P (or 9P) male plug 1 as needed.

4. The battery fixing plate body 5 of the battery fixing plate 100 is provided with slots 3 respectively located at the two sides, the slots 3 mentioned above are configured to fix the whole battery fixing plate 100 along with the battery onto the battery base assembly 200. The middle forking gap is disposed in a middle portion of the battery fixing plate body 5, and the middle forking gap is consisted of a V-shaped slit 6 disposed in the rear part and an ellipse-shaped slit 7; and the rear part has two handheld feet.

Upon analysis of the structural relationship mentioned above, it can be known that when two sides of the U-shaped battery fixing plate body 5 are held and squeezed inwardly by the operator's hands respectively, the two sides of the U-shaped battery fixing plate body 5 are drawn closer to each other and shrink inwardly to a certain extent, then inserted into the sliding slots 8 of the battery base assembly 200, so that the tabs 9 disposed on two sides of the inner wall of the battery base assembly 200 are snapped to the slots 3 located on two sides of the battery fixing plate 100, then the battery fast installation is completed.

When the two sides of the U-shaped battery fixing plate body 5 are respectively held and squeezed inwardly by the operator's hands again, the battery fixing plate body 5 slides outwards away from the sliding slots 8 in the battery base assembly 200 again, so that the tabs 9 disposed on two sides of the inner wall of the battery base assembly 200 are separated from the slots 3 located on two sides of the battery fixing plate 100, then the battery fast removal is completed.

The battery base assembly is as follows (the main structure of the battery base assembly 200 mentioned above is the battery base body, meanwhile further includes the sliding slots 8 and tabs 9 disposed on two sides of an inner wall of the battery base body and the female socket 10 located on a front part of the battery base body, among others, wherein the top fiberglass board 11, the middle fiberglass board 12 and the bottom fiberglass board 13 and so on are assembled to form the battery base body).

Figure 6:
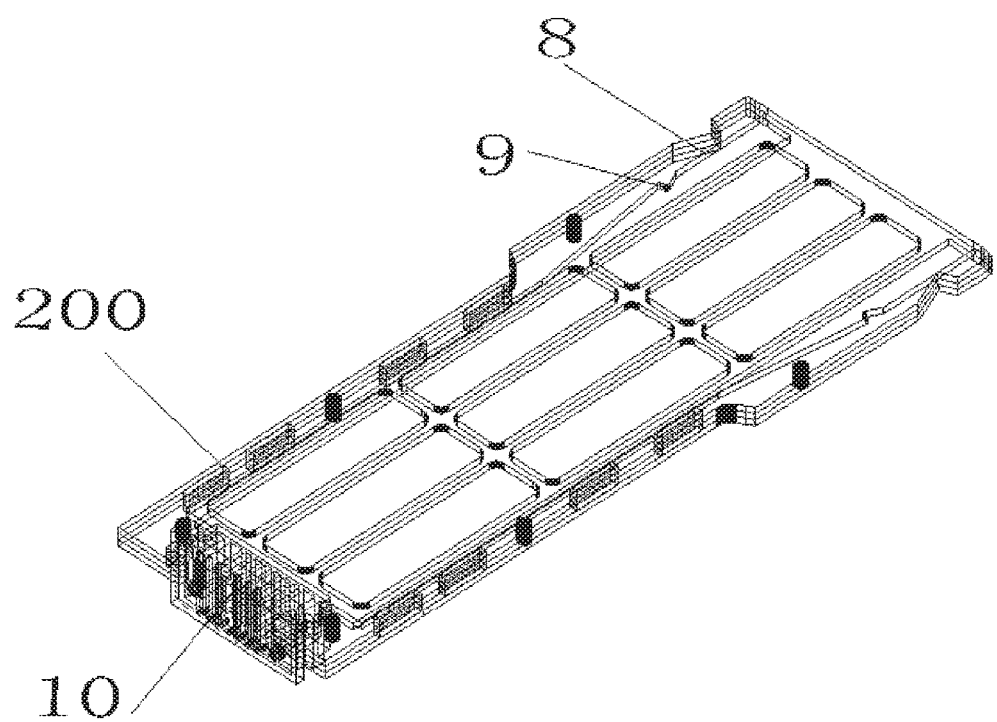
FIG. 6 is an assembly structural schematic view of a battery base assembly in the universal device for quickly plugging and unplugging a battery of a UAV provided by embodiments of the present invention.
Figure 7:
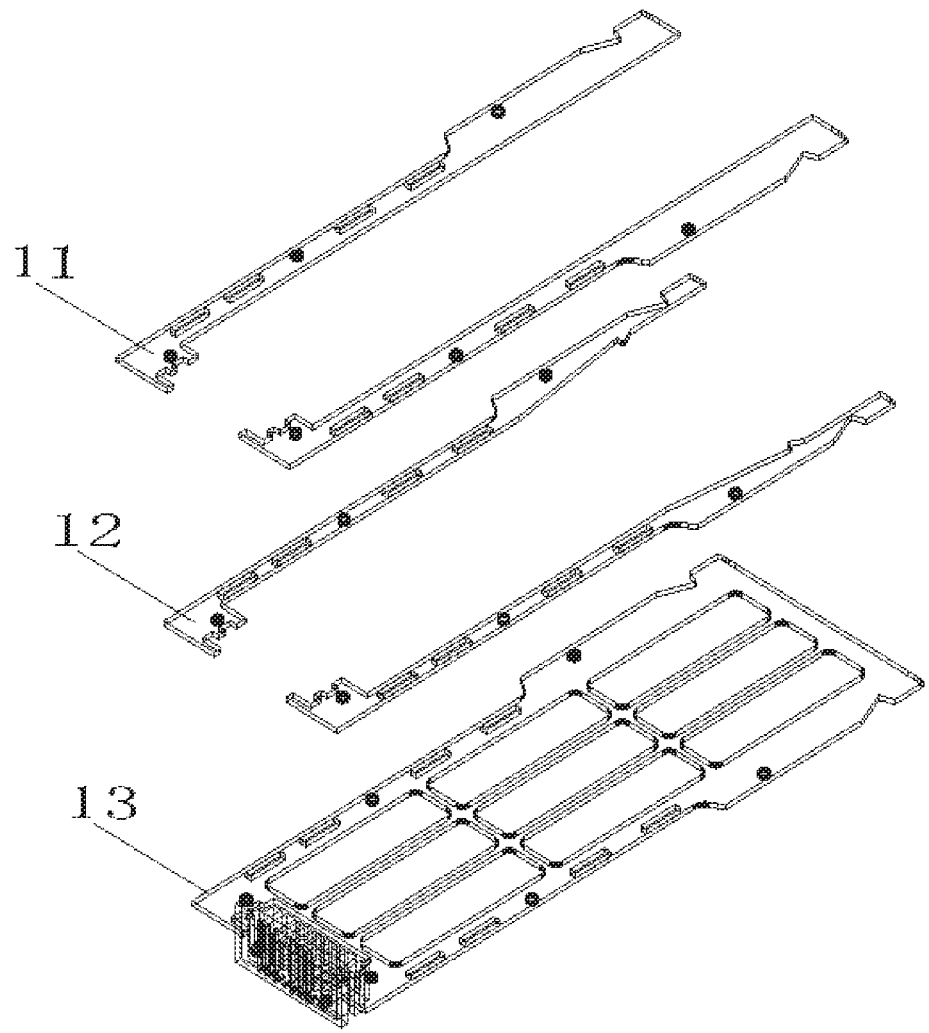
FIG. 7 is an exploded structural schematic view of the battery base assembly of the universal device for quickly plugging and unplugging a battery of a UAV provided by embodiments of the present invention in FIG. 6.
Figure 8:
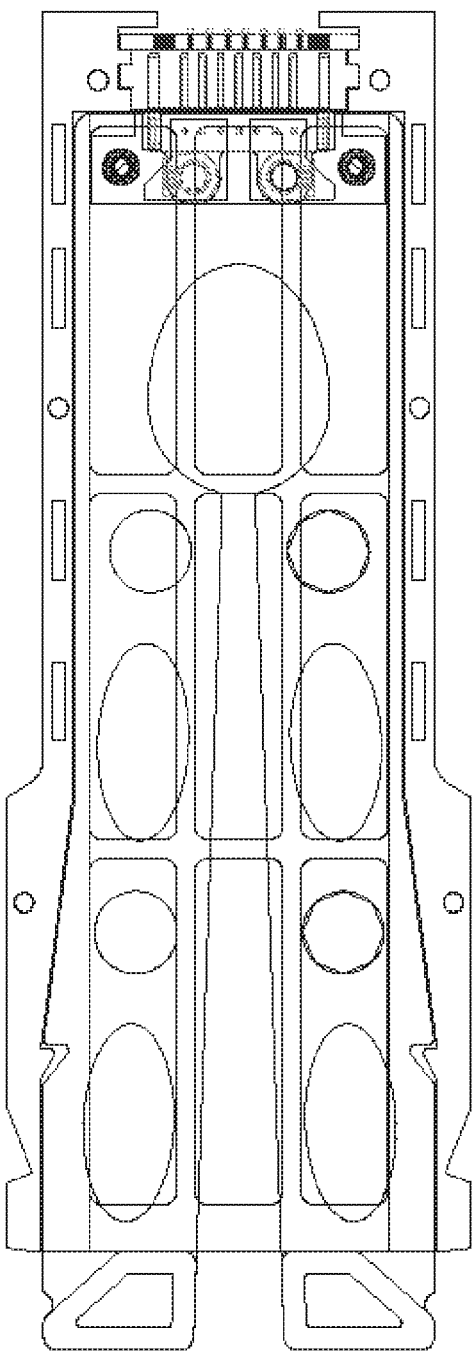
FIG. 8 is a top structural schematic view of the general assembly of the universal device for quickly plugging and unplugging a battery of a UAV provided by embodiments of the present invention.

FIG. 6 and FIG. 7 are structural schematic views of the battery base assembly.

1. The battery base body is formed by stacking three fiberglass (or other non-conductive material) boards tightly.

2. One 7P or 9P female socket is disposed on the top of the battery base body, to connect the main board and the battery board.

3. In the three fiberglass boards, the bottom fiberglass board needs to be fixed on the body of a UAV. The middle fiberglass board and the battery fixing plate are in a same plane, the tabs 9 are disposed on the corresponding positions, for snapped with the slots 3 on the battery fixing plate. The top fiberglass board extends beyond the middle fiberglass by 3 mm.

4. The three fiberglass boards are provided with a sliding slot, and the battery fixing plate together with the battery can be easily inserted and pulled out from the rear part thereof. After being inserted, the 7P (or 9P) male plug on the battery fixing plate is connected to the 7P (or 9P) female socket on the battery base.

In summary, the universal device for quickly plugging and unplugging a battery of a UAV is provided by embodiments of the present invention, with a lot of innovations and improvements to the battery structure on the mainstream market. The technical advantages at least include the following aspects:

1. The battery can be simply and rapidly replaced, wherein it can be seen from the technical solutions mentioned above that once the battery is fixed on the battery fixing plate, the battery can be inserted along the sliding slot to the end, that is, the battery can be locked and activated. Velcro and cable ties are left out and the plugging and unplugging operations of the plug are eliminated. Holding the two handheld feet by two hands can easily pull out the battery to complete the rapid plugging and unplugging of the battery.

2. The battery base assembly of the universal device for quickly plugging and unplugging a battery of a UAV can be mounted on a same plane with the aircraft motor, which makes the center of gravity of the battery closer to the axis line of the overall frame.

3. It has beautiful and reliable structure, wherein the universal device for quickly plugging and unplugging a battery of a UAV mentioned above has a compact structure occupying a small space, only slightly larger than the area of the battery. It can be easily designed suitable to the body of a variety of UAVs. And the structure is solid and reliable, and of high-strength, and the battery is uneasy to slide.

4. The universality and compatibility are high, wherein for above universal device for quickly plugging and unplugging a battery of a UAV, a general battery pack, which occupies a space not exceeding a specified space, can be replaced by the user. It can be seen from the above technical solutions that the 2s, 3s and 4s batteries commonly used by the model aircrafts on the market can be conveniently mounted onto the battery fixing plate. Therefore the universality and compatibility are much stronger than those existing in the market.

5. Production costs are low. The materials are simple, and the mold opening is not needed. The mass production and assembly are simple. The universal device for quickly plugging and unplugging a battery of a UAV mentioned above does not need to open a mold, therefore all components only need the machining operation. It is easy to obtain the 7P or 9P product in the market, and easy to find other connectors at different cost to replace it. It is superior to the situation of using a dedicated battery case in terms of the material cost, production costs, and assembly difficulty.

Finally, it should be noted that the above embodiments are only provided for describing the technical solutions of the present invention, and not intended to limit the present invention. Although the present invention has been described in detail referring to the embodiments, those skilled in the art should appreciate that modifications may be made to the technical solutions of the above embodiments, or replacements may be made to part or all of the technical features thereof. These modifications or replacements will not make the corresponding technical solution depart from the scope of the present invention essentially.

The invention claimed is:

1. A universal device for quickly plugging and unplugging a battery of a UAV (unmanned aerial vehicle), comprising a battery fixing plate (100) and a battery base assembly (200);
wherein, the battery fixing plate (100) comprises a battery fixing plate body (5), a male plug (1) and copper pillars (2) located on a front part of the battery fixing plate body (5), and slots (3) and handheld feet (4) located on two sides of a rear part of the battery fixing plate body (5);
the battery fixing plate body (5) is U-shaped as a whole, a middle forking gap is disposed between the two sides of the battery fixing plate body (5) but does not pass through the front part of the battery fixing plate body (5), and the middle forking gap is consisted of a V-shaped slit (6) disposed in the rear part and an ellipse-shaped slit (7) disposed in the front part;
wherein, the battery base assembly (200) comprises a battery base body formed by assembling a plurality of fiberglass boards, sliding slots (8) and tabs (9) disposed on two sides of an inner wall of the battery base body, and a female socket (10) located on a front part of the battery base body;
the battery fixing plate (1X)) and the battery base assembly (200) is in a connection relationship in which the two sides of the U-shaped battery fixing plate body (5) of the battery fixing plate (100) are respectively slidably connected with the sliding slots (8) in two sides of the inner wall of the battery base body of the battery base assembly (200); the tabs (9) on two sides of the inner wall of the battery base body are snapped with the slots (3) on two sides of the battery fixing plate body (5); the handheld feet (4) are configured to connect the battery fixing plate (100) and the battery base assembly (200) by adjusting a width of the middle forking gap of the U-shaped battery fixing plate body (5).

2. The universal device for quickly plugging and unplugging a battery of a UAV as claimed in claim 1, characterized in that,
the battery base assembly (200) is of a structure in which the plurality of the fiberglass boards are three fiberglass boards, which respectively comprise from top to bottom a top fiberglass board (11), a middle fiberglass board (12) and a bottom fiberglass board (13);
and an accommodating hole is disposed in the top fiberglass board (11) and the middle fiberglass board (12) for accommodating the battery fixing plate (100); a hollow grid shelf is disposed in the bottom fiberglass board (13); the top fiberglass board (11), the middle fiberglass board (12) and the bottom fiberglass board (13) are sequentially stacked to form the battery base body; the inner wall of the middle fiberglass board (12) is inwardly recessed comparing with the inner walls of the top fiberglass board (11) and the bottom fiberglass board (13), to form the sliding slots (8) on two sides of the inner wall of the battery base body; the tabs (9) on two sides thereof is located on the middle fiberglass board (12).

3. The universal device for quickly plugging and unplugging a battery of a UAV as claimed in claim 1, characterized in that
the universal device for quickly plugging and unplugging a battery of a UAV further comprises an adhesive layer which is configured to fix the battery to a surface of the battery fixing plate body (5) in the battery fixing plate (100).

4. The universal device for quickly plugging and unplugging a battery of a UAV as claimed in claim 1, characterized in that
the male plug (1) is a 7P male plug or a 9P male plug.

5. The universal device for quickly plugging and unplugging a battery of a UAV as claimed in claim 1, characterized in that,
the female socket (10) is a 7P female socket or a 9P female socket.

6. The universal device for quickly plugging and unplugging a battery of a UAV as claimed in claim 1, characterized in that
the handheld feet (4) as a whole protrude from a surface of the rear part of the battery fixing plate body (5).

7. The universal device for quickly plugging and unplugging a battery of a UAV as claimed in claim 6, characterized in that
a surface of the handheld foot (4) is provided with a hollow, facilitating a finger to insert.

8. The universal device for quickly plugging and unplugging a battery of a UAV as claimed in claim 1, characterized in that a plurality of through holes are provided in a surface of the battery fixing plate body (5) and on two sides of the middle forking gap.

9. The universal device for quickly plugging and unplugging a battery of a UAV as claimed in claim 8, characterized in that the plurality of through holes are arranged at an equal interval on the surface of the battery fixing plate body (5) and on two sides of the middle forking gap; the plurality of through holes are circular or oval through holes.

10. The universal device for quickly plugging and unplugging a battery of a UAV as claimed in claim 2, characterized in that the hollows in the bottom fiberglass board (13) is plural, and the plurality of hollows are uniformly arranged in a grid to form the hollow grid shelf to support the battery fixing plate body (5).

* * * * *